(12) United States Patent
Potkonjak

(10) Patent No.: US 9,014,008 B2
(45) Date of Patent: Apr. 21, 2015

(54) FORWARD-LOOKING PROBABILISTIC STATISTICAL ROUTING FOR WIRELESS AD-HOC NETWORKS WITH LOSSY LINKS

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 1164 days.

(21) Appl. No.: 12/539,608

(22) Filed: Aug. 12, 2009

(65) Prior Publication Data

US 2011/0038306 A1 Feb. 17, 2011

(51) Int. Cl.
*H04L 12/26* (2006.01)
*H04W 40/12* (2009.01)
*H04L 12/721* (2013.01)

(52) U.S. Cl.
CPC .............. *H04W 40/12* (2013.01); *H04L 45/123* (2013.01); *H04W 40/125* (2013.01)

(58) Field of Classification Search
None
See application file for complete search history.

(56) References Cited

U.S. PATENT DOCUMENTS

| | | | | |
|---|---|---|---|---|
| 2002/0186665 A1* | 12/2002 | Chaffee et al. | | 370/255 |
| 2004/0146007 A1 | 7/2004 | Saadawi et al. | | |
| 2004/0203380 A1* | 10/2004 | Hamdi et al. | | 455/41.2 |
| 2005/0249185 A1* | 11/2005 | Poor et al. | | 370/349 |
| 2006/0062175 A1 | 3/2006 | Ling et al. | | |
| 2006/0126514 A1 | 6/2006 | Lee et al. | | |

OTHER PUBLICATIONS

PCT Notification of Transmittal of the International Search Report and the Written Opinion of the International Search Authority, or the Declaration, Aug. 24, 2010.
Atul Adya et al., "A Multi-Radio Unification Protocol for IEEE 802.11 Wireless Networks", Proceeding of the First International Conference on Broadband Networks, IEEE, Oct. 25-20, 2004, pp. 344-354.
Daniel Aguayo et al., "Link-level Measurements from an 802.11b Mesh Network", SIGCOMM, Proceedings of the 2004 Conference on Applications, technologies, architectures, and protocols for computer, ACM, Aug. 30-Sep. 3, 2004, pp. 121-132, Portland, Oregon, USA.
Christopher L. Barrett et al., "Parametric Probabilistic Sensor Network Routing", Proceedings of the 2nd ACM International Conference on Wireless Sensor Networks and Applications, Sep. 19, 2003, pp. 122-131, San Diego, California, USA.
Josh Broch et al., "A Performance Comparison of Multi-Hop Wireless Ad Hoc Network Routing Protocols", Proceedings of the 4th Annul ACM/IEEE International Conference on Mobile Computing and Networking, Oct. 25-30, 1998, pp. 85-97, Dallas, Texas, USA.

(Continued)

*Primary Examiner* — Jackie Zuniga Abad
(74) *Attorney, Agent, or Firm* — Ren-Sheng International

(57) ABSTRACT

Techniques related to a localized routing approach are generally described where the number of transmissions, the maximum number of transmission per node, effective bandwidth, the latency, overall energy consumption, the maximum energy consumption, or other individual or composite objective in a wireless network may be optimized. The localized routing approach may use a metric that combines immediate progress benefit and expense with a statistics-based forward looking estimation of future routing properties and cost. The protocol may also employ a combination of probabilistic and deterministic mechanism to detect and escape local minima.

15 Claims, 14 Drawing Sheets

(56) References Cited

OTHER PUBLICATIONS

Jehoshua Bruck et al., "MAP: Medial Axis Based Geometric Routing in Sensor Networks", Proceedings of the 11th Annual International Conference on Mobile Computing and Networking, 2005, pp. 88-102.

Alberto Cerpa et al., "Statistical Model of Lossy Links in Wireless Sensor Networks", Fourth International Symposium on Information Processing in Sensor Networks, Apr. 15, 2005, pp. 81-88.

Ching-Chuan Chiang et al., "Routing in Clustered Multihop, Mobile Wireless Networks with Fading Channel", IEEE SICON, 1997, pp. 1-15.

Douglas S. J. De Couto et al., "A High-Throughput Path Metric for Multi-Hop Wireless Routing", Mobicom, ACM, Sep. 14-19, 2003, pp. 134-146, San Diego, California, USA.

"MICAz Wireless Measurement System", Crossbow Technology, Inc., 2003 http://www.xbow.com.

Alan Demers et al., "Epidemic Algorithms for Replicated Database Maintenance", Proceedings of the 6th Annual ACM Symposium on Principles of Distributed Computing, 1987, pp. 1-12.

Richard Draves et al., "Comparison of Routing Metrics for Static Multi-Hop Wireless Networks", SIGCOMM, Aug. 30-Sep. 3, 2004, pp. 133-144, Portland, Oregon, USA.

Silvia Giordano et al., "Position Based Ad Hoc Routes in Ad Hoc Networks", Handbook of Ad-Hoc Wireless Networks, CRC Press, 2003, Chapter 16, pp. 1-24.

Lewis Girod et al., "Em*: a Software Environment for Developing and Deploying Wireless Sensor Networks", USENIX Technical Conference, 2004, pp. 283-296.

Zygmunt J. Haas et al., "The Performance of Query Control Schemes for the Zone Routing Protocol", IEEE/ACM Transactions on Networking, vol. 9, No. 4, Aug. 2001, pp. 427-438.

Jason L. Hill et al., "MICA: A Wireless Platform for Deeply Embedded Networks", IEEE Micro, Nov.-Dec. 2002, pp. 12-24, vol. 22, Issue 6.

Rahul Jain et al., "Geographical Routing Using Partial Information for Wireless Ad Hoc Networks", IEEE Personal Communications, Feb. 2001, pp. 48-57, vol. 8, Issue 1.

David B. Johnson et al., "Dynamic Source Routing in Ad Hoc Wireless Networks", In Mobile Computing, Kluwer Academic Publishers, 1996, Chapter 5, pp. 1-18.

Brad Karp et al., "GPSR: Greedy Perimeter Stateless Routing for Wireless Networks", Proceedings of the 6th Annual International Conference on Mobile Computing and Networking, ACM, 2000, pp. 243-254.

David Kempe et al., "Spatial Gossip and Resource Location Protocols", Proceedings of the 33rd annual ACM Symposium on Theory of Computing, 2001, pp. 1-22.

Srinivasan Keshav, "A Control-Theoretic Approach to Flow Control", Conference on Communications Architecture & Protocols, ACM, 1991, pp. 3-15.

Seungjoon Lee et al., "Efficient Geographic Routing in Multihop Wireless Networks", MobiHoc, May 25-27, 2005, pp. 230-241.

Jinyang Li et al., "A Scalable Location Service for Geographic Ad Hoc Routing", Proceedings of the 6th Annual International Conference on Mobile Computing and Networking, ACM, 2000, pp. 120-130.

Jun Luo et al., "Route Driven Gossip: Probabilistic Reliable Multicast in Ad Hoc Networks", 22nd Annual Joint Conference of the IEEE Computer and Communications, 2003, pp. 2229-2239, vol. 3.

Martin Mauve et al., "A Survey on Position-based Routing in Mobile Ad Hoc Networks", IEEE Network, Nov.-Dec. 2001, pp. 30-39, vol. 15, Issue 6.

Prosenjit Bose et al., "Routing with Guaranteed Delivery in Ad Hoc Wireless Networks", Wireless Networks, Kluwer Academic Publishers, 2001, pp. 609-616, vol. 7.

Vincent D. Park et al., "A Highly Adaptive Distributed Routing Algorithm for Mobile Wireless Networks", 16th Annual Joint Conference of the IEEE computer and Communications Societies, 1997, pp. 1405-1413, vol. 3.

Charles E. Perkins et al., "Ad-Hoc On-Demand Distance Vector Routing", IEEE Workshop on Mobile Computing Systems and Applications, Feb. 25-26, 1999, pp. 90-100.

Charles E. Perkins et al., "Highly Dynamic Destination-Sequenced Distance-Vector Routing(DSDV) for Mobile Computers", Proceedings of the Conference on Communications Architectures, Protocols and Applications, ACM, 1994, pp. 234-244.

Elizabeth M. Royer et al., "A Review of Current Routing Protocols for Ad Hoc Mobile Wireless Networks", IEEE Personal Communications, Apr. 1999, pp. 46-55, vol. 6, Issue 2.

Sergio D. Servetto et al., "Constrained Random Walks on Random Graphs: Routing Algorithms for Large Scale Wireless Sensor Networks", Proceedings of the 1st ACM International Workshop on Wireless Sensor Networks and Applications, Sep. 28, 2002, pp. 12-21.

Hideaki Takagi et al., "Optimal Transmission Ranges for Randomly Distributed Packet Radio Terminals", IEEE Transactions on Communications, Mar. 1984, pp. 246-257, vol. 32, No. 3.

Alec Woo et al., "Taming the Underlying Challenges of Reliable Multihop Routing in Sensor Networks", SenSys, Nov. 5-7, 2003, pp. 14-27, Los Angeles, California, USA.

Jerry Zhao et al., "Understanding Packet Delivery Performance in Dense Wireless Sensor Networks", SenSys, Nov. 5-7, 2003, pp. 1-13, Los Angeles, California, USA.

\* cited by examiner

Algorithm 1 FPSR

1: while routing is not completed do
2:     $t_o = 0$; $t_e = 0$;
3:     local_min = NO; escape_criteria = NO;
4:     move forward using ROF;
5:     while local_min == NO & escape_criteria == NO do;
6:         move forward using ROF;
7:         prob($t_o$)++;
8:         if forward move is impossible then
9:             local_min = YES; escape_criteria = YES;
10:        end if
11:    end while;
12:    while escape_criteria == YES do
13:        send message using escape mode ROF;
14:        prob($t_o$)++; prob($t_e$)++;
15:        if $t_e > k_{em}$ then
16:            local_min == NO; escape_criteria == NO;
17:        end if;
18:    end while
19:    if $t_o > k_{om}$ then
20:        abandon delivery; change destination=sender; $t_o$=0;
21:    end if;
22:    $t_e = 0$;
23: end while

FIG. 12

FORWARD-LOOKING PROBABILISTIC STATISTICAL ROUTING FOR WIRELESS AD-HOC NETWORKS WITH LOSSY LINKS

BACKGROUND

Unless otherwise indicated herein, the approaches described in this section are not prior art to the claims in this application and are not admitted to be prior art by inclusion in this section.

A wireless ad-hoc network is a network of computers and devices (hereafter simply as "nodes") that are connected by wireless communication links (hereafter simply as "links"). As each link has a limited communication range, some nodes cannot communicate directly so they forward packets to each other via one or more cooperating intermediate nodes. A source node transmits a packet to a neighboring node with which it can communicate directly. The neighboring node in turn transmits the packet to one of its neighboring nodes, and so on until the packet is transmitted to a destination node. Each link that a packet is sent over is referred to as a hop, and the set of links that a packet travels over from the source node to the destination node is called a route or a path. Routes are determined by running a routing protocol on the wireless ad-hoc multi-hop network. Routes may be distributive determined at each node based on local information available to the node.

The links may be implemented with digital packet radios. The links may be lossy as a result of the use of inexpensive radios and low cost and low power requirements for the wireless ad-hoc network. Thus, what is needed is a routing protocol suitable for a wireless ad-hoc network with lossy links.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 12 shows a pseudo code of an algorithm that summarizes a probabilistic approach for escaping the local;

DETAILED DESCRIPTION

Figure 1:
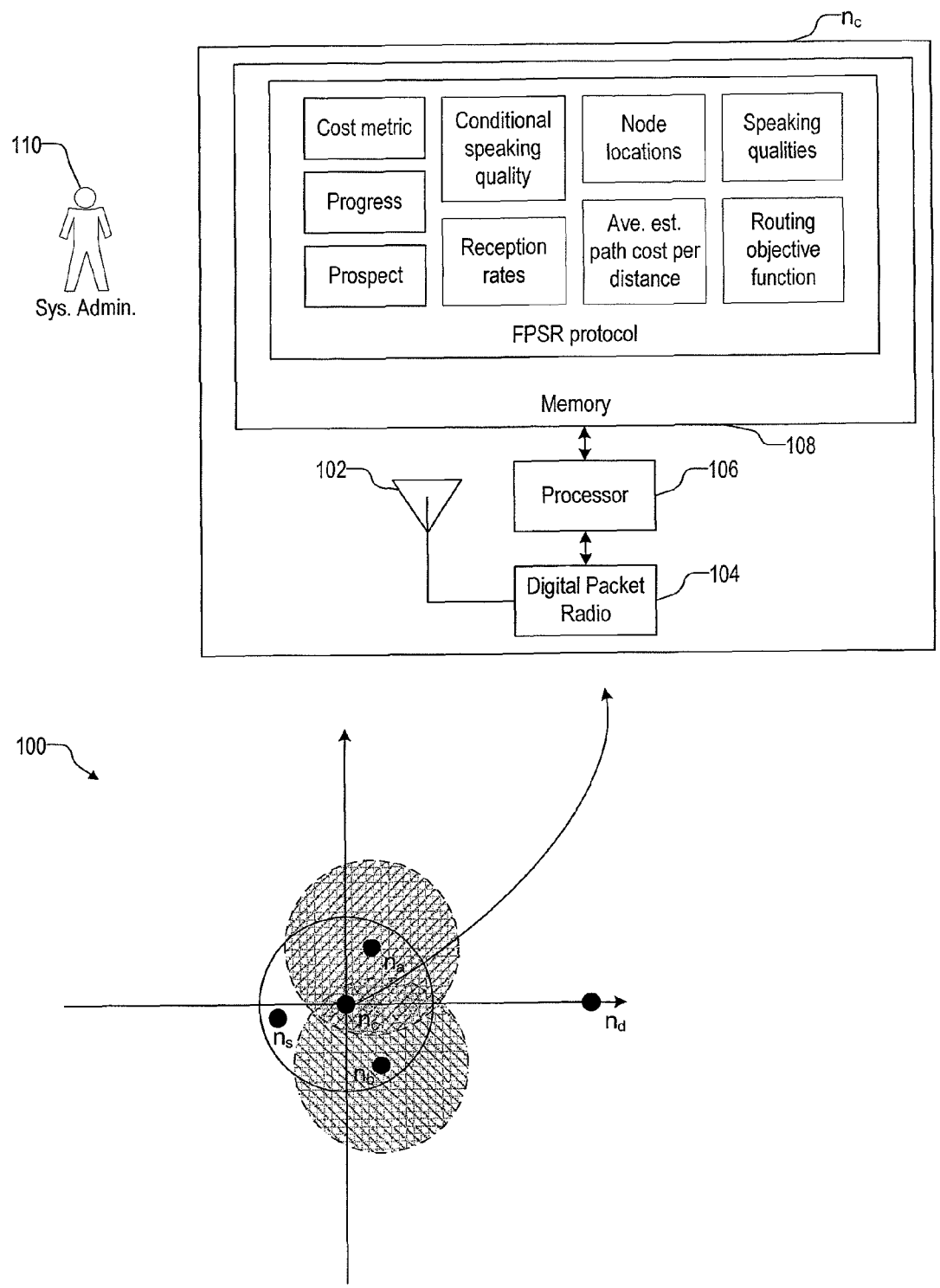
FIG. 1 illustrates a wireless ad-hoc network utilizing a forward-looking probabilistic statistical routing (FPSR) protocol.

In the following detailed description, reference is made to the accompanying drawings, which form a part hereof. In the drawings, similar symbols may identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs, and systems related to routing protocols for wireless ad-hoc networks with lossy links.

Embodiments of the present disclosure generally relate to a method for designing a localized routing protocol for a wireless network based on statistical modeling and evaluation. One example localized routing protocol is the Forward-looking Probabilistic Statistical Routing (FPSR) protocol. The FPSR protocol may consider the properties and the impact of lossy links in the networks. The FPSR protocol may be forward-looking because it may consider the "progress" towards the destination node made in an immediate hop from a current node to a neighbor node, and the "prospect" from consequent hops towards the destination node after the immediate hop. In other words, progress may represent the estimated cost of the overall route while prospect may represent the estimate cost of the immediate node selection. Progress may be defined as the sum of a locally estimated cost from the current node to the neighbor node and a globally estimated cost from the neighbor node to the destination node. In one or more embodiments, prospect may be based on the estimated link quality of the next hop from the neighbor node, which may be based on the relative link quality of the neighbor node with respect to its neighbor nodes. A routing objective function (ROF) based on progress and prospect may be used to evaluate each neighbor node.

The FPSR protocol may be statistical because progress and prospect may be statistical measures. The FPSR protocol may be probabilistic because it may use probabilistic mechanisms to detect and escape from local minima in the routing (i.e., any neighbor node that does not have a neighbor node that is closer to the destination node than itself).

FIG. 1 illustrates a wireless network 100 utilizing the FPSR protocol in one or more embodiments of the present disclosure. Wireless network 100 includes nodes $n_a$, $n_b$, $n_c$, $n_d$, and $n_s$.

The FPSR protocol is a distributed routing algorithm that may be executed locally at each node to determine the next hop in a route from a source node to a destination node. In a running example throughout the present disclosure, the FPSR protocol may be explained in the context of a current node $n_c$ determining which of its neighbor nodes $n_a$ and $n_b$ to forward a packet that originated from a source node $n_s$ and may be destined for a destination node $n_d$. Alternatively, current node $n_c$ may send a packet on its own for destination node $n_d$.

Nodes $n_a$, $n_b$, $n_c$, and $n_s$ may be wireless sensors, cellular telephones, laptops, computers, handheld computing devices, and other wireless devices. Destination node $n_d$ may be a stationary gateway to an external internet. Current node $n_c$ may include an antenna 102, a digital packet radio 104, a processor 106, and a memory 108 for storing the FPSR protocol. Processor 106 may execute the FPSR protocol from memory 108 and may be configured to utilize digital packet radio 104 with antenna 102 to send/receive packets to/from other nodes. Digital packet radio 104 may include a separate transmitter and receiver, or a transceiver when the transmitter and receiver functions are combined. For simplicity, other hardware and software components of current node $n_c$ are not shown. Nodes $n_a$, $n_b$, $n_d$, and $n_s$ may be similarly configured as current node $n_{cNode\ ni}$ is used hereafter denote any of the nodes.

The FPSR protocol may be optimized to deliver a packet from current node $n_c$ to destination node $n_d$ using the minimal number of transmissions (including retransmissions). The FPSR protocol may have a small-state routing strategy where each node may utilize locally available information to select one of its neighbor nodes as the next node to send the packet. The locally available information may include one or more of a 2D location of the node and its neighbor nodes, the forward and reverse reception rates of links (forward and reverse links) between the node and its neighbor nodes, the forward and reverse reception rates of the links between its neighbor nodes and their neighbor nodes, and/or the 2D location of the destination.

Figure 2:
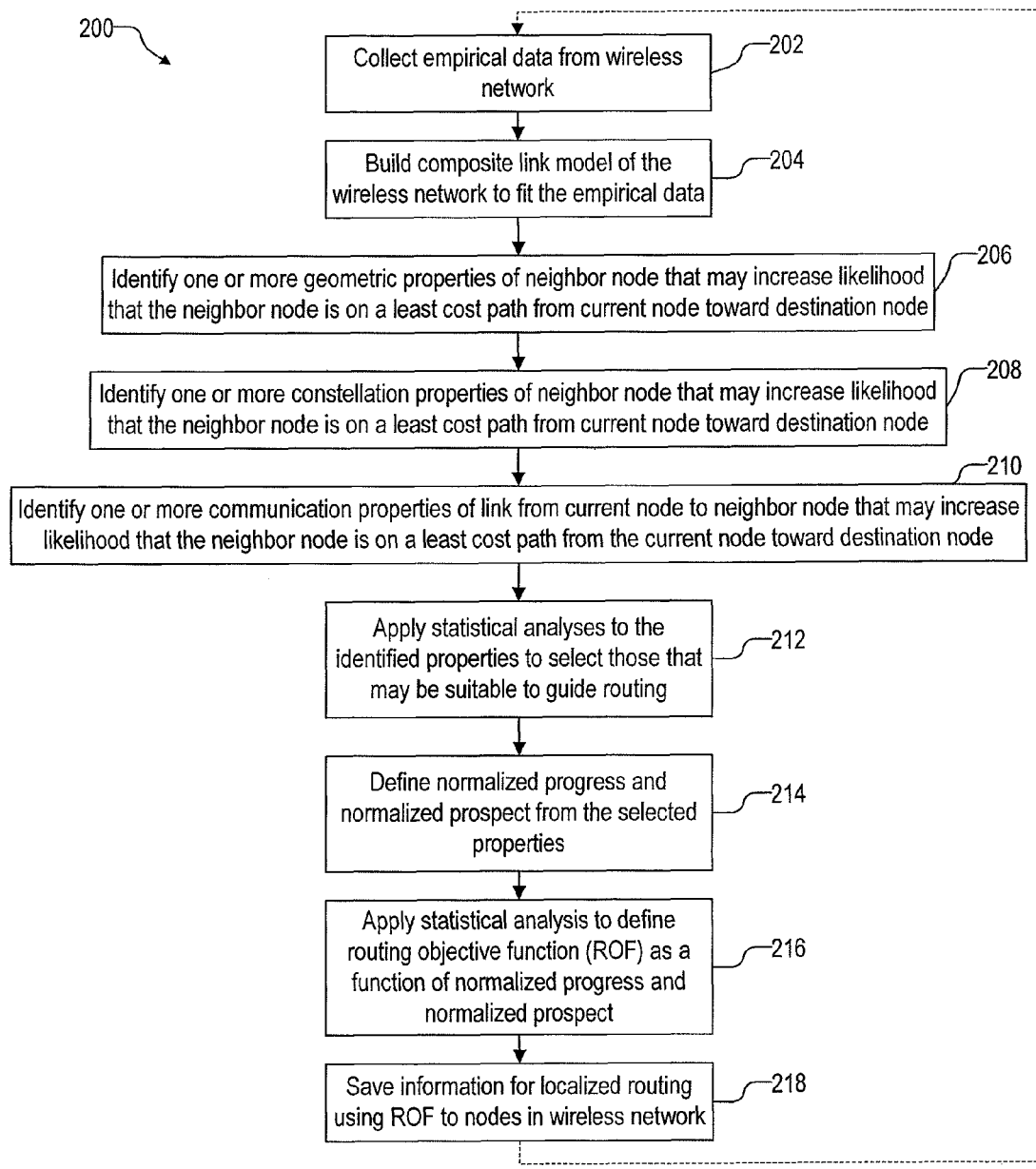
FIG. 2 is a flowchart of a method to determine a routing objective function (ROF) of the FPSR protocol for the wireless network of FIG. 1.

FIG. 2 is a flowchart of a method 200 for designing the FPSR protocol for wireless network 100 in one or more embodiments of the present disclosure. Method 200 includes one or more operations, functions, or actions illustrated by blocks 202, 204, 206, 208, 210, 212, 214, 216 and/or 218. Method 200 may be implemented with the assistance of a computer.

Processing for method 200 may begin at block 202, where the method may collect empirical data from the wireless network. Continuing to block 204, the method may build a composite link model of the wireless network may to fit the collected empirical data. Processing may continue at block 206, where the method may identify one or more geometric properties of neighbor nodes from the composite link model, where the identified geometric properties may increase the likelihood that the neighbor node is on a least cost path from a current node toward a destination node. Processing may proceed to block 208, where the method may identify one or more constellation properties of neighbor nodes in the composite link model, where the identified constellation properties may increase the likelihood that the neighbor node is on a least cost path from the current node toward the destination node. The method may continue at block 210, where the method may identify one or more communication properties of a link from the current node to a neighbor node in the composite link model, where the identified communication property may increase the likelihood that the neighbor node is on a least cost path from the current node toward the destination node. Proceeding to block 212, the method may apply statistical analyses to the identified properties to select those properties that may be suitable to guide routing. Continuing to block 214, the method may define normalized progress and normalized prospect from the selected properties. Proceeding to block 216, the method may apply statistical analysis to define a routing objective function (ROF) as a function of the normalized progress and the normalized prospect. Continuing to block 218, the method may save information for localized routing using the ROF to the nodes in the wireless network. Block 218 may be followed by block 202, where method 200 may be repeated.

In block 202, empirical data may be collected from wireless network 100 as follows. Each node may be adapted to broadcast a probe packet in a round robin fashion. The nodes in wireless network 100 may each be configured to record the probe packets received. From the empirical data, the reception rate of each link from a sending node to a receiving node and the geometric distance between the sending and the receiving node may be determined. The empirical data may be collected over a period of time or continuously. A learn and test method may be used where the empirical data may be collected until the reception rate of each link has settled to a consistent value. Periodically a smaller sample of the empirical data may be collected to determine if the reception rate of each link remains consistent with its prior value. If not, the empirical data may be collected until the reception rate of each link has settled to a consistent value.

If the wireless network has already been operational, the empirical data may be collected in the following manner. Nodes that have better links to neighbor nodes (e.g., have high reception rates) may transmit more for collecting empirical data often so they may be well modeled with sufficient empirical data as they are more likely to be used in any routing protocol. Also, nodes that have links that are difficult to model (e.g., the links have high temporal variability) may transmit more often so they may be well modeled with sufficient empirical data. Furthermore, nodes that have many neighbor nodes may transmit more often so many links may be well modeled with sufficient empirical data. Block 202 may be followed by block 204.

In block 204, various link models of wireless network 100 may be built to fit the empirical data as follows. A network designer/operator or a software program, such as one that employs machine learning software tools, may build the statistical models. The statistical models of wireless network 100 may be studied to determine properties that may be used for routing. The statistical models may be link models, radio models, channel models, traffic models, location models, and any combination thereof. One or more link models may be used to determine progress, and one or more radio models may be used to determine prospect. In one or more embodiments of the present disclosure, the link models of wireless network 100 may include one or more frequency link models, including, but not limited to one or more of: (i) a single link model, (ii) a forward and reverse link model, and/or (iii) an average cost per distance model. In one or more embodiments of the present disclosure, the radio models of wireless network 100 may include one or more frequency radio models, including, but not limited to, a speaking and listening qualities model. These models are described later after method 200.

In block 204, a cost metric may also be defined. The cost metric may quantify the cost of transmitting a single packet in terms of energy, bandwidth, and latency as described below. In the underlying communication protocol in wireless network 100, a sending node (hereafter "node $n_A$") may be adapted to send a packet to a receiving node (hereafter "node $n_B$") and wait for receipt of an acknowledgement packet from node $n_B$. The wait interval may be several times longer than the time required for node $n_B$ to receive the packet and to send an acknowledgement back to node $n_a$. If node $n_A$ does not receive an acknowledgement from node $n_B$ after the expiration of the wait interval, node $n_A$ may retransmit the packet to node $n_B$.

There may be a forward link from the transmitter of node $n_A$ to the receiver of node $n_B$ with an estimated forward reception rate $P_{AB}$, and a reverse link from the transmitter of node $n_B$ to the receiver at node $n_A$ with an estimated reverse reception rate $P_{BA}$. It may be assumed that there is no correlation between two consecutive transmissions. The estimated number of transmissions of a packet from node $n_A$ to node $n_B$ required for node $n_B$ to successfully receive the packet may be expressed as $1/P_{AB}$. The estimated number of transmissions of a packet from node $n_A$ to node $n_B$ required for node $n_A$ to receive an acknowledgement from node $n_B$ in reply may be denoted by $FR_{AB}$ and may be defined as follows.

$$FR_{AB} = \frac{1}{P_{AB} P_{BA}} \quad (1)$$

The estimated number of transmissions of an acknowledgement from node $n_B$ to node $n_A$ required for node $n_A$ to successfully receive the acknowledgement may be denoted by $BR_{BA}$ and may be defined as follows.

$$BR_{BA} = \frac{P_{AB}}{P_{AB} P_{BA}} = \frac{1}{P_{BA}} \quad (2)$$

The estimated total number of transmissions by both nodes $n_A$ and $n_B$ may be denoted by a compound reception rate ($CRR_{AB}$) and may be defined as follows.

$$CRR_{AB} = FR_{AB} + BR_{BA} = \frac{1}{P_{AB} P_{BA}} + \frac{1}{P_{BA}} \quad (3)$$

Figure 7:
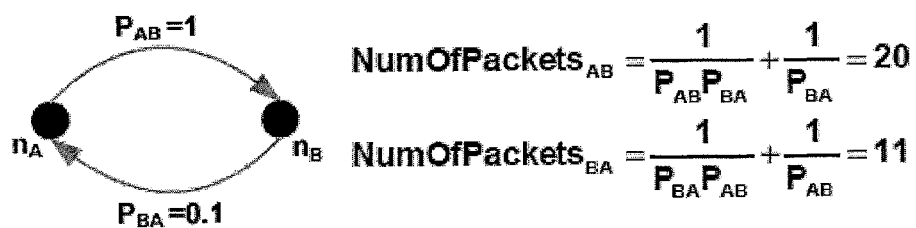
FIG. 7 shows an example of a compound reception rate for sending packets between two nodes.

$CRR_{AB}$ may be set as the estimated two-way link cost from node $n_A$ to node $n_B$. An interesting observation is that $FR_{AB}$ may be similar to $BR_{BA}$, but $CRR_{AB}$ and $CRR_{BA}$ may be very different. FIG. 7 shows an example of $CRR_{AB}$ for sending packets between nodes $n_A$ and $n_B$, in accordance with the present disclosure. While $FR_{AB}$ and $BR_{BA}$ are both 10 based on reception rates $P_{AB}$ and $P_{BA}$ provided in FIG. 7, $CRR_{AB}$ is 20 and $CRR_{BA}$ is 11.

Referring back to FIG. 2, in block 206, one or more geometric properties of neighbor node $n_i$ that may increase the likelihood that neighbor node $n_i$ is on a least cost path from current node $n_c$ toward destination node $n_d$ may be identified from observing the link models. A network designer/operator or a software program that uses statistical rules, heuristic rules, or both, may identify the geometric properties. Geometric properties of neighbor node $n_i$ include one or more of the location coordinates, the reduction in geometric distance to destination node $n_d$, the normalized unexplored area, the weighted unexplored area, and any combination of these properties.

Location coordinates, $(x_i, y_i)$, of neighbor node $n_i$ may provide a complete specification of both its progress toward the destination node $n_d$ as well as the area around neighbor node $n_i$ that is unknown to current node $n_c$.

The reduction in geometric distance to destination, $DR_{ic}$, from selecting neighbor node $n_i$ may be the difference between a first geometric distance, $D_{cd}$, from current node $n_c$ to destination node $n_d$ and a second geometric distance, $D_{id}$, from neighbor node $n_i$ to destination node $n_d$.

The normalized unexplored area, $AU_i$, of neighbor node $n_i$ may be the area around neighbor node $n_i$ that is unknown to current node $n_c$. It may assume that after a certain geometric distance r, the links have a close to zero reception rate. Geometric distance r may be 12 meters in wireless network 100. The normalized unexplored area of neighbor node $n_i$ may be the area that is covered by the maximal communication range in a radius around neighbor node $n_i$ but does not include the maximal communication range radius around current node $n_c$. The normalized unexplored area of neighbor node $n_i$ may be approximated using the following trigonometric formula:

$$AU_i = \frac{\pi r^2 - r^2(q - \sin(q))}{\pi r^2}, \quad (4)$$

where $q = 2 * \arccos\left(\frac{d}{2r}\right)$ and d is the geometric distance between current node $n_c$ and neighbor node $n_i$.

The weighted unexplored area, $AUR_i$, of neighbor node $n_i$ may be a portion of the normalized unexplored area that is closer to destination node $n_d$ than current node $n_c$. The weighted unexplored areas may be approximated using the formula:

$$\cos(\theta_i) * AU_i, \quad (5)$$

where $\theta_i$ is the angle between a first line formed by current node $n_c$ and destination node $n_D$, and a second line formed by current node $n_c$ and destination node $n_i$. Block 206 may be followed by block 208.

In block 208, one or more constellation (graph topology) properties of neighbor node $n_i$ that may increase the likelihood that neighbor node $n_i$ is on a least cost path from current node $n_c$ toward destination node $n_d$ may be identified from observing the link models. A network designer/operator or a software program that uses statistical rules, heuristic rules, or both, may identify the constellation properties. Constellation properties include the number of common neighbor nodes between current node $n_c$ and neighbor node $n_i$, the geometric distance from each common neighbor node to destination node $n_d$, the normalized unexplored area of each common neighbor node, and any combination of these properties. The constellation properties may help to identify a path that passes two or more hops through known neighbor nodes since shorter links may be of better quality than long direct links. Block 208 may be followed by block 210.

In block 210, one or more communication properties of a link from current node $n_c$ to a neighbor $n_i$ that may increase the likelihood that neighbor node $n_i$ is on a least cost path from current node $n_c$ toward destination node $n_d$ may be identified from observing the link models. A network designer/operator or a software program that uses statistical rules, heuristic rules, or both, may identify the communication properties.

The communication properties include the estimated two-way link cost from current node $n_c$ to neighbor $n_i$, the speaking and listening qualities of neighbor node $n_i$, and any combination of these properties.

The estimated two-way link cost from current node $n_c$ to neighbor $n_i$, $C_{ci}$, may be equal to the CCR and may be rewritten as follows.

$$C_{ci} = CCR_{ci} = \frac{1}{P_{ci}P_{ic}} + \frac{1}{P_{ic}} \qquad (6)$$

$P_{ci}$ is the estimated forward reception rate from the transmitter of current node $n_c$ to the receiver of neighbor node $n_i$, and $P_{ic}$ is the estimated reverse reception rate from the transmitter of neighbor node $n_i$ to the receiver at current node $n_c$.

The speaking and listening qualities of neighbor node $n_i$, $SL_i$, may be the geometric mean of listening quality $S(n_i)$ and listening quality $L(n_i)$. Block 210 may be followed by block 212.

In block 212, statistical analyses may be applied to the identified properties to select those that may be suitable to guide routing. A network designer/operator or a software program that uses statistical rules, heuristic rules, or both, may select the properties. Monte Carlo (MC) simulations of wireless network 100 may be used to find the effects of each property on the overall efficiency of the routing. Each neighbor node $n_i$ may be given two coordinates: (i) a first coordinate that indicates the value (or relative ranking) of the targeted property, and (ii) a second coordinate that indicates the cost (or relative ranking) of the least cost path from current node $n_c$ through neighbor node $n_i$ to destination node $n_d$. The least cost path may be determined with the Floyd-Warshall algorithm, the Dijkstra algorithm, or a combination of the algorithms.

One to several millions of MC simulations may be run for each property by determining the least cost path between randomly selected source and destination nodes and tracking the coordinates of the neighbor nodes. Once the simulation data is collected, statistical techniques such as regression and kernel smoothing may be applied. Isotonic regression and isotonic density estimation may be used. The use of statistical analysis may result in a reduction of 3 orders of magnitude in the required amount of Monte Carlo simulation runs for obtaining a particular level of confidence.

The properties may be analyzed by either building statistical models that predict routability from a property or by using consistency measures. Consistency may indicate the percentage of situations for which a higher value of a property corresponds to a smaller path and a lower value of the property coincides with a longer path. Both consistency values close to 100% and 0% may indicate a good predictor and the values close to 50% may indicate poor predictors since the change in the property does not affect the length of the path in a particular way. Based on the statistical models or the consistency measures, the selected properties may be the two-way link cost and the conditional speaker quality (described later). Block 212 may be followed by block 214.

In block 214, normalized progress and normalized prospect may be defined from the selected properties. A network designer/operator or a software program can use a combination of search and statistical software tools to find the best definition for a given objective and a wireless network or even in general.

Progress of a neighbor node $n_i$ may be defined as the estimated path cost from current node $n_c$ to destination node $n_d$ through neighbor node $n_i$. Progress has two components: an estimated two-way link cost from current node $n_c$ to neighbor node $n_i$, and an average estimated path cost from neighbor node $n_i$ to destination node $n_d$. Normalized progress may be determined by dividing progress by the best (e.g., lowest) progress of all the neighbor nodes.

There may be ways to further refine the normalized progress. The estimated two-way link cost may have a higher weight than the average estimated path cost because the two-way link cost may be known more accurately and any localized routing scheme may not be able to determine a path as well as well as the optimal strategy. In one or more embodiments, the estimated two-way link cost and the average estimated path cost may be weighed equally to avoid over-tuning the FPSR protocol and to increase the robustness of the FPSR protocol.

Normalized prospect of a neighbor node $n_i$ may capture the impact of the information that is available to current node $n_c$ about what may be achieved in one hop immediately after the hop to neighbor node $n_i$. The information may be related to the transmitter quality of each of the neighbor nodes, common neighbor nodes of current node $n_c$ and neighbor node $n_i$, the likelihood that significant and cost-effective progress toward destination node $n_d$ can be made using neighbor node $n_i$ as the intermediate hop toward the common neighbor nodes, and the weighted unexplored area of neighbor node $n_i$.

Normalized prospect may be defined as the conditional speaker (transmitter) quality (CSQ) of a neighbor node $n_i$. The CSQ of neighbor node $n_i$ may be equal to the speaking quality of neighbor node $n_i$ if it has at least one neighbor node that provides more than a predetermined chance for a faster rate of progress toward the destination. To determine if neighbor node $n_i$ has a neighbor node that provides more than a predetermined chance for a faster rate of progress toward the destination, the difference between speaker qualifies of the two nodes is divided by the speaker quality of neighbor node $n_i$ to see if the result is greater than the predetermined chance. The speaking qualities of neighboring nodes may be periodically exchanged with dedicated packets or be included in acknowledgment packets. The predetermined chance may be 50%. When neighbor node $n_i$ does not have at least one neighbor node that provides more than a predetermined chance for a faster rate of progress toward the destination, the CSQ of neighbor node $n_i$ may be set equal to zero. Alternatively, the normalized prospect may be set equal to the product of CSQ, normalized weighted unexplored area, and the normalized number of known neighbor nodes. Block 214 may be followed by block 216.

Figure 9:
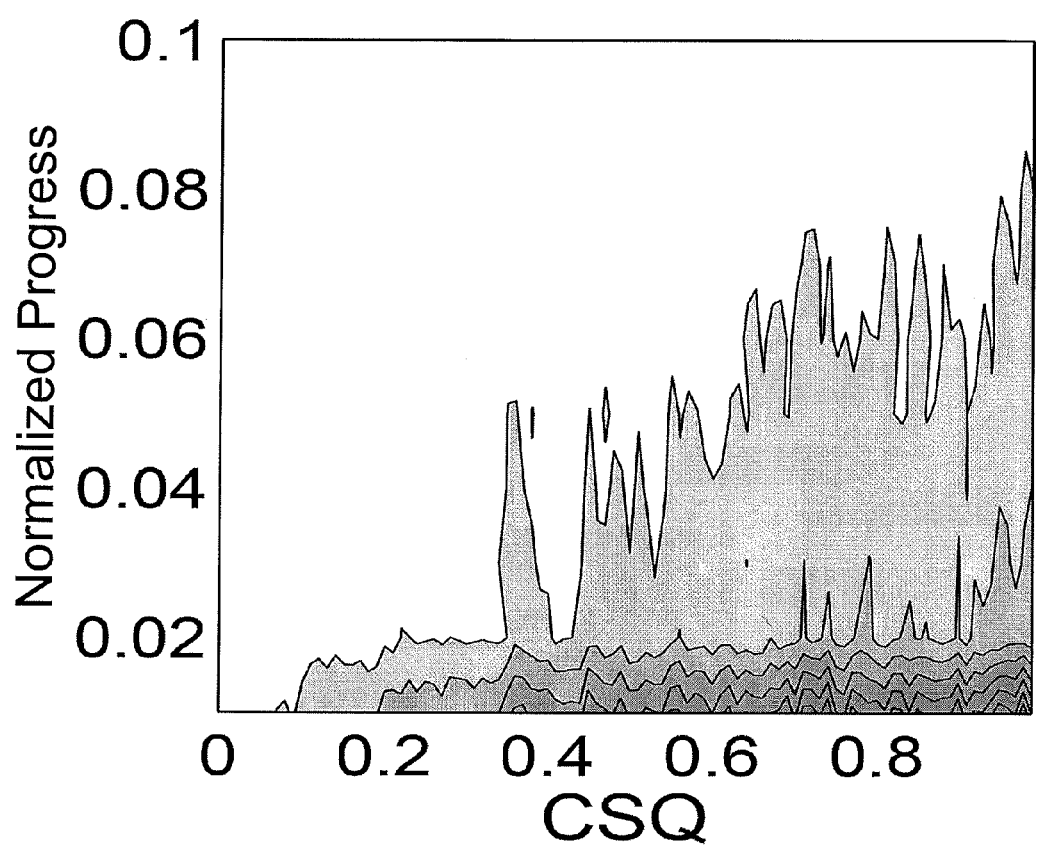
FIG. 9 is a plot of ROF level sets of neighbor nodes with respect to change in normalized progress and normalized prospect.

In block 216, the ROF may be defined as a function of the normalized progress and the normalized prospect. A network designer/operator or a software program can use a search software tool to find the best definition for a given objective and a wireless network or even in general. The neighbor node with the best ROF value may be selected as the next node in the path to destination node $n_d$ in the FPSR protocol. Monte Carlo simulations and statistical analysis may be used to determine the ROF. FIG. 9 shows the ROF level sets of neighbor nodes with respect to the difference in normalized progresses between current node $n_c$ and neighbor node $n_i$, and normalized prospect (CSQ), in accordance with the present disclosure. The darker area may indicate a higher percentage of the neighbor nodes belonging to the least cost path.

Figure 10:
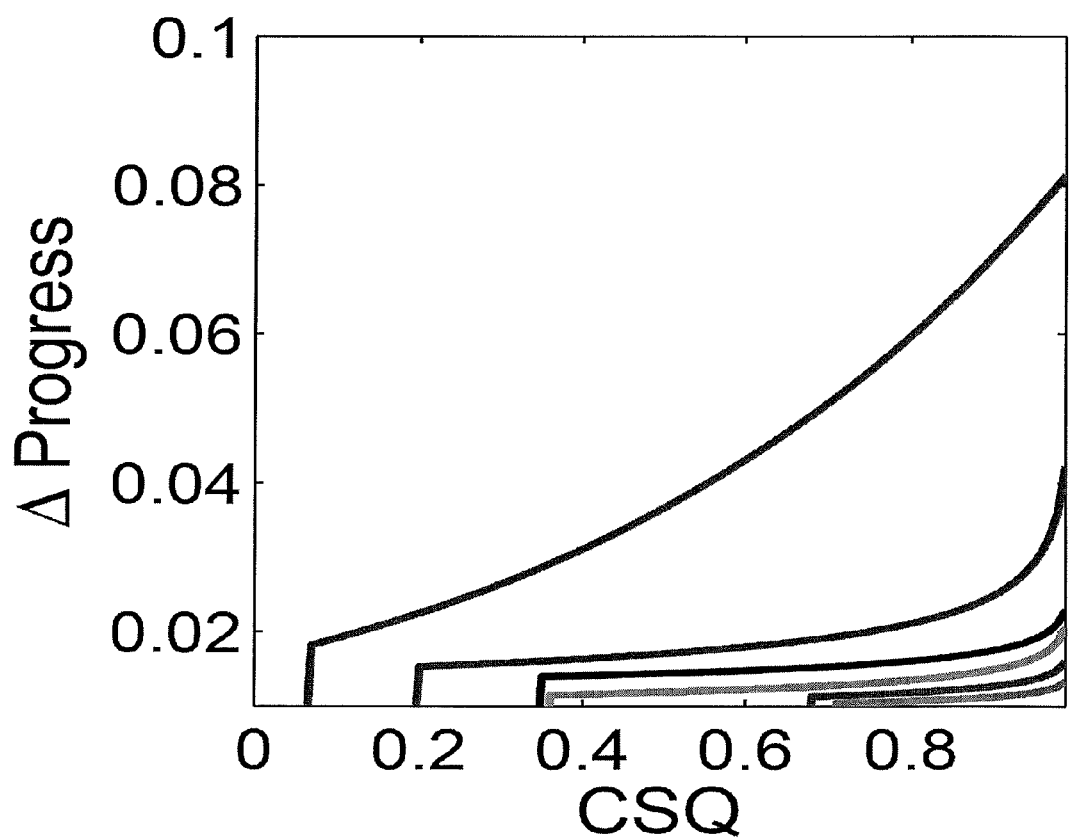
FIG. 10 is a plot of ROF level sets of FIG. 9 after statistical processing.

To enhance robustness and to reduce the storage needs, the ROF level sets in FIG. 9 may be statistically approximated using the quadratic regression functions. FIG. 10 is a plot of ROF level sets of FIG. 9 after statistical processing, in accordance with the present disclosure. The quadratic regression functions of FIG. 10 may be stored at each node. The neighbor node that is below the largest number of the quadratic regression functions may be the node with the best ROF and may be selected as the node with next node in the path to destination node $n_d$. Block 216 may be followed by block 218.

In block 218, the information for localized routing using the ROF may be saved to the nodes in wireless network 100. The information may include one or more of the cost metric, the average estimated path cost function (FIG. 8), the equations for the normalized progress, the normalized prospect, the speaking quality, and the CSQ, an/or the quadratic regression functions of the ROF (FIG. 10).

Single Link Model

Figure 3:
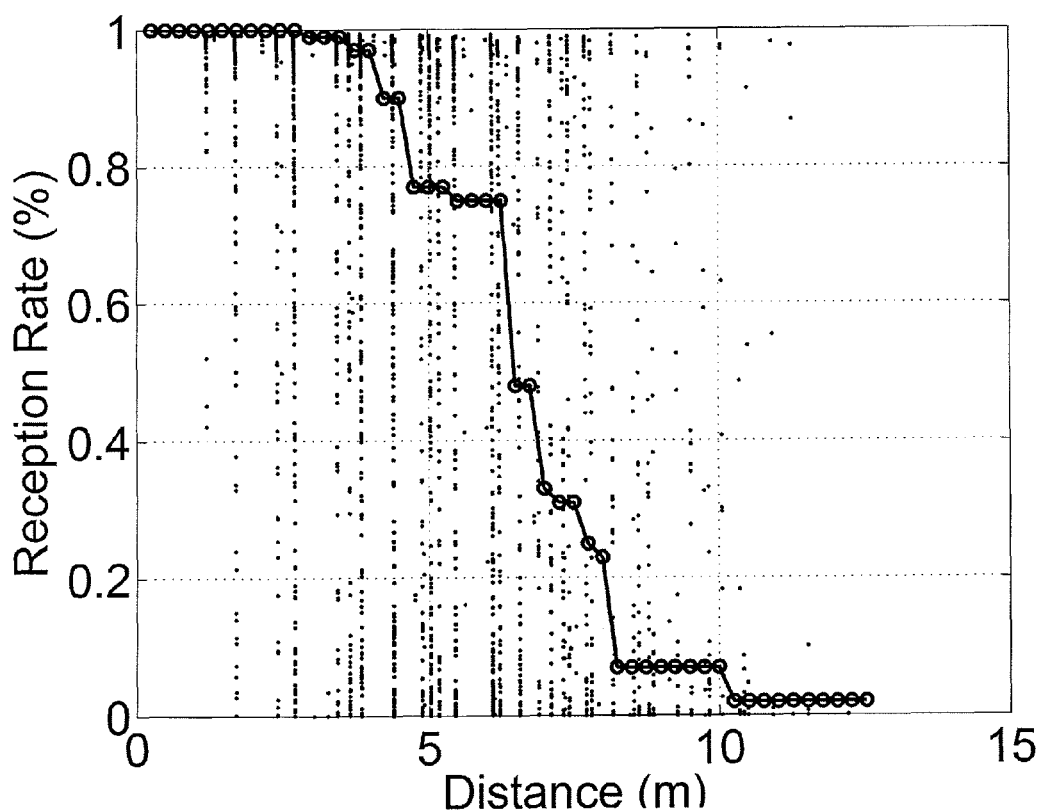
FIG. 3 is a scatter plot of reception rates of links from sending nodes to receiving nodes as a function of the geometric distance between the sending and the receiving nodes based on example empirical data.

FIG. 3 shows is a scatter plot of reception rates of links from sending nodes to receiving nodes as a function of the geometric distance between the sending and the receiving nodes based on example empirical data, in accordance with the present disclosure. A bold piecewise linear line shows an $L_1$ monotonic regression fit of the data points in the scatter plot. It may be important to consider both the geometric distance and the reception rate of a particular link because there may be a range of reception rates for a given geometric distance and some longer links may have better reception ranges than some shorter links.

Forward and Reverse Link Model

Figure 4:
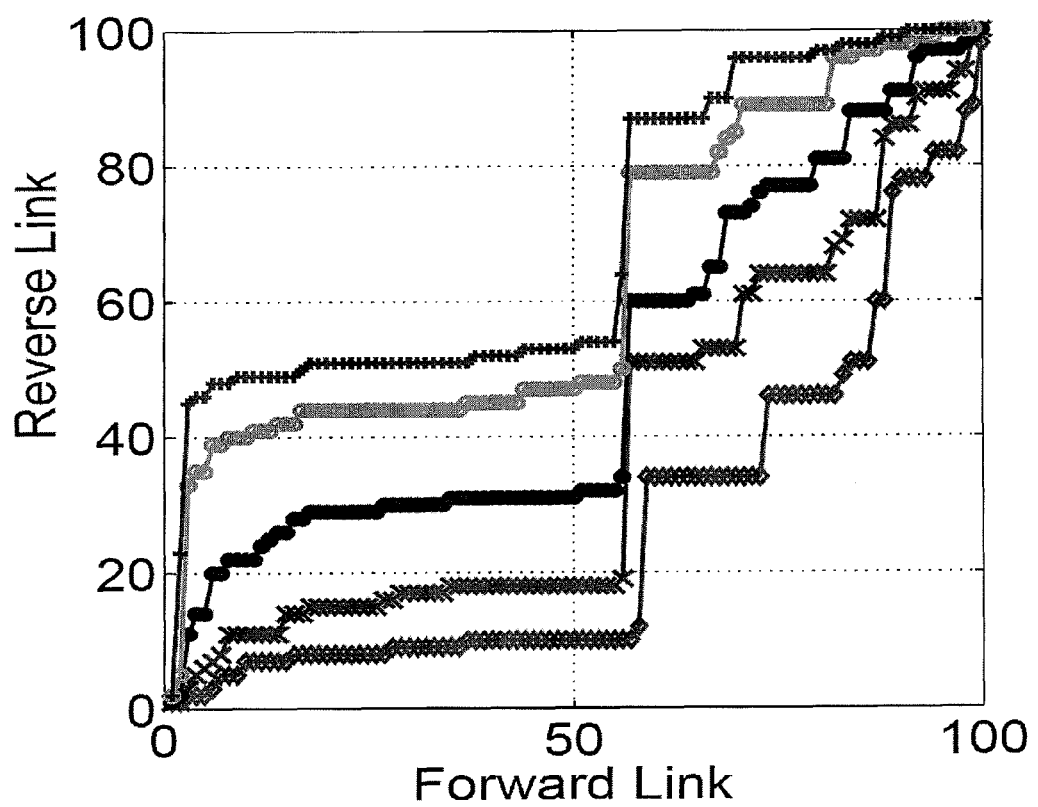
FIG. 4 is a plot of a monotonic kernel estimation of a function that maps the reception rats the forward links to reception rates of reverse links based on the example empirical data.

There are two links between each pair of neighbor nodes: (1) a forward link from the transmitter of the first neighbor node to the receiver of the second neighbor node, and (2) a reverse link from the transmitter of the first neighbor node to the receiver at the second neighbor node. FIG. 4 shows a monotonic kernel estimation of a function that maps the RR of the forward link (x-axis) to the RR of a reverse link (y-axis) based on the example empirical data, in accordance with the present disclosure. The piecewise lines from the bottom to the top indicate that 12.5%, 25%, 50%, 75%, and 87.5% of the data points are respective below each of the lines. Even though link asymmetry exists, the forward links with high reception rates may have a higher probability of having high reception rates on the corresponding reverse links than forward links with low reception rates.

Speaking and Listening Qualities

The digital packet radios in the nodes may be of different qualities. The qualities of the transmitter and the receiver (or the transceiver, depending on the specific implementation) of the digital packet radio of a node may be separately evaluated. The transmitter quality (hereafter "speaking quality") and the receiver quality (hereafter "listening quality") of a node $n_i$ may be defined as follows.

$$S(n_i) = \Pi_{k=1}^{N_{Ni}} \sqrt[N_{Ni}]{C_{ik}} \quad (7)$$

$$L(n_i) = \Pi_{k=1}^{N_{Ni}} \sqrt[N_{Ni}]{C_{ki}} \quad (8)$$

$S(n_i)$ is the speaking quality of neighbor node $n_i$, $L(n_i)$ is the listening quality of neighbor node $n_i$, $N_{Ni}$ is the total number of neighbor nodes of node $n_i$ where each neighbor node of node $n_i$ is denoted by $n_k$, $k=1, \ldots, N_{Ni}$, $C_{ik}$ is the estimated two-way link cost from node $n_i$ to neighbor node $n_k$, and $C_{ki}$ is the estimated two-way link cost from neighbor node $n_k$ to node $n_i$. A cost metric for determining estimated two-way link costs based on the reception rates is described later.

Figure 5:
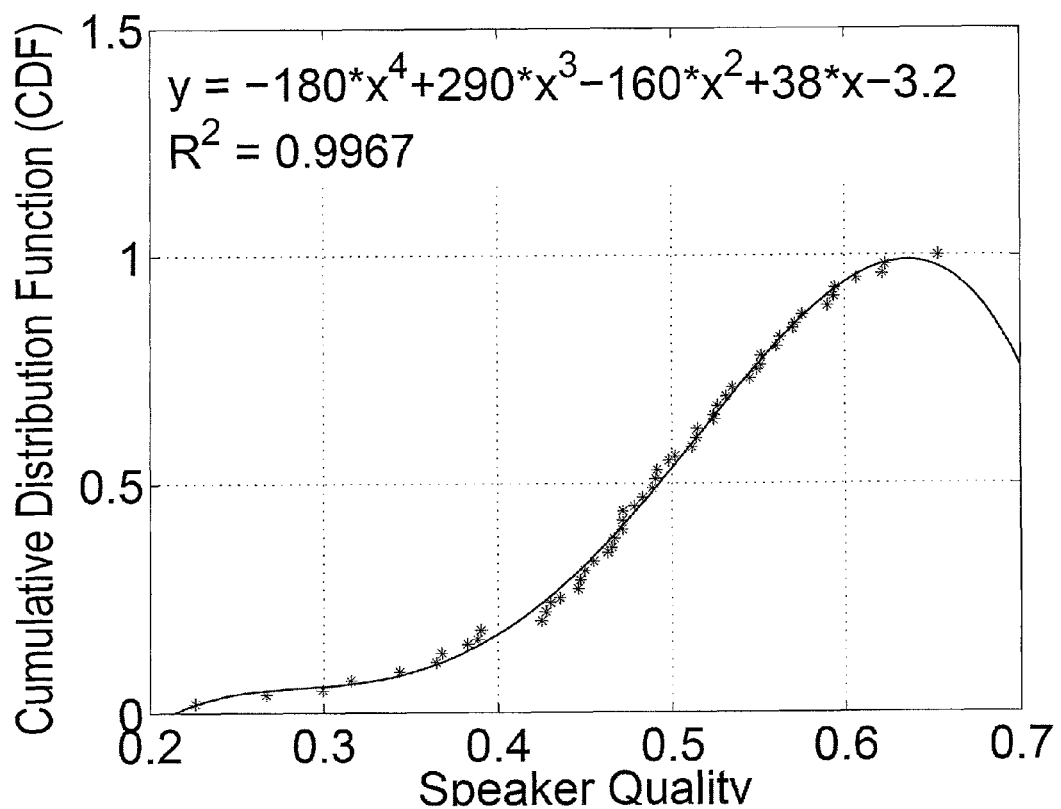
FIGS. 5 and 6 are plots of the sorted relative quality of the transmitters and the receivers in the nodes, respectively, based on the example empirical data.
Figure 6:
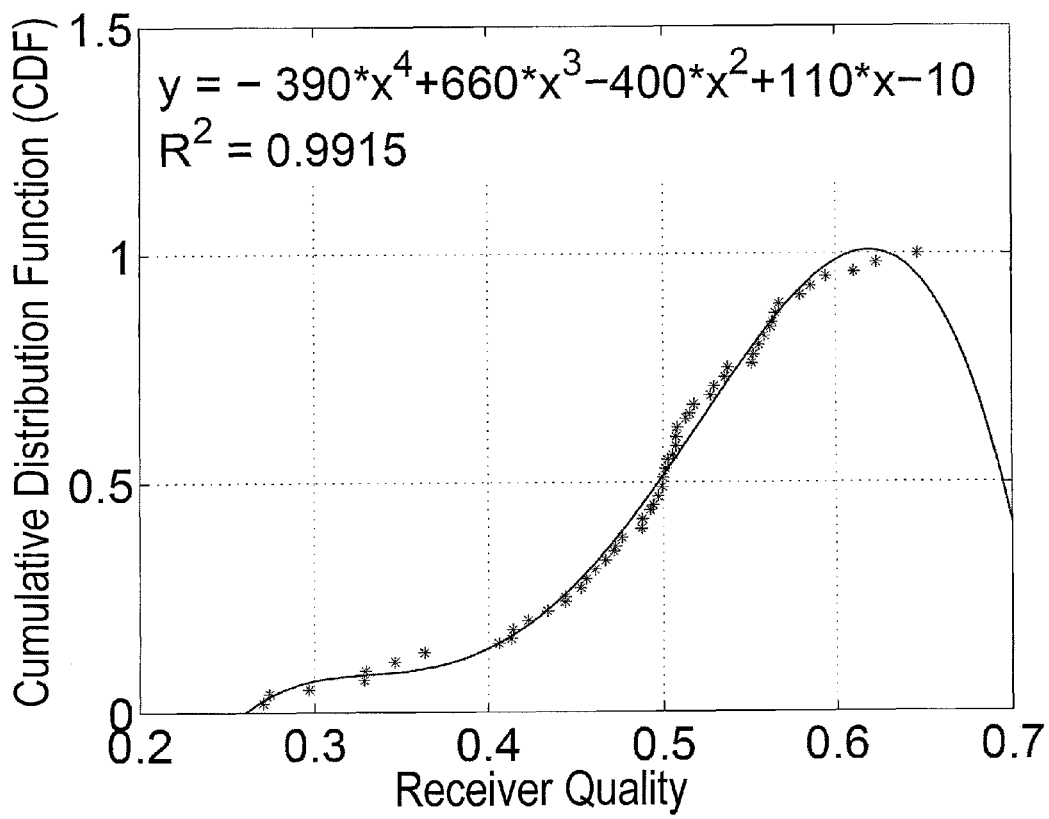

FIGS. 5 and 6 show the sorted relative quality of the transmitters and the receivers in the nodes, respectively, based on the example empirical data, in accordance with the present disclosure. The relative speaking or listening quality is defined as the average of $S(n_i)$ or $L(n_i)$. On the x-axis is the normalized speaking or listening quality of the transmitter or the receiver. On the y-axis is the smooth value of the cumulative distribution function (CDF). In some examples, the model of FIGS. 5 and 6 is applicable for speaking and listening qualities less than or equal to approximately 0.65. It may be advantageous to send packets through some nodes than others because their radios are intrinsically better than the radios in other nodes.

Average Cost Pre Distance Model

Figure 8:
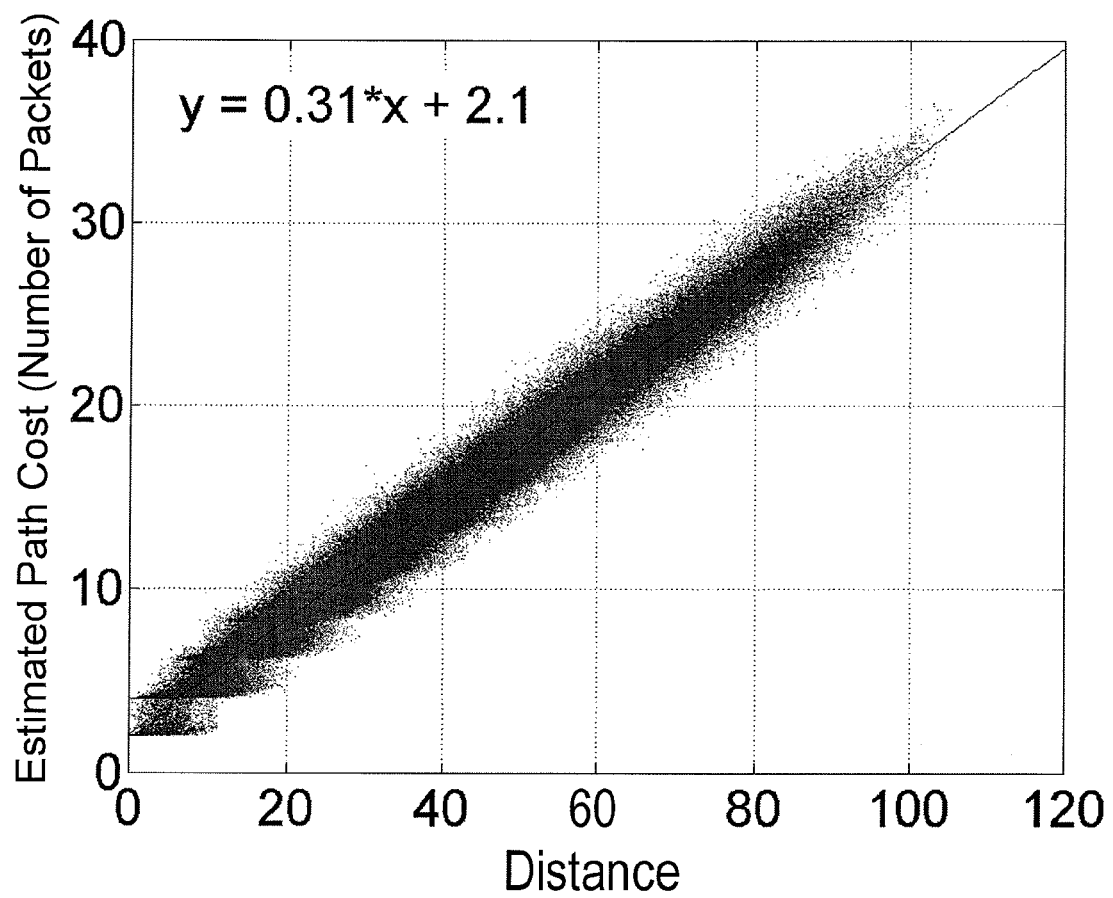
FIG. 8 is a plot of estimated costs of least cost paths from source nodes to destination nodes as a function of geometric distances between the source and the destination nodes based on the example empirical data.

FIG. 8 shows a plot of estimated costs of least cost paths from source nodes to destination nodes as a function of geometric distances between the source and the destination nodes based on the example empirical data, in accordance with the present disclosure. The least cost path from a source node to a destination node may be determined from the Floyd-Warshall algorithm, the Dijkstra algorithm, or a combination of the algorithms. The estimated cost of a least cost path may be the sum of the estimated two-way link costs in the least cost path. A line in the plot may show a linear regression fit of the data points. As the geometric distance between the source and the destination nodes increases, the relative accuracy of the estimated cost of the least cost path may increase.

In addition to reception rates, autocorrelation values and cross-correlation values may be determined from the example empirical data. Based on their values, a temporal link model or a frequency-temporal link model may be constructed instead of the frequency link model described above.

Figure 11:
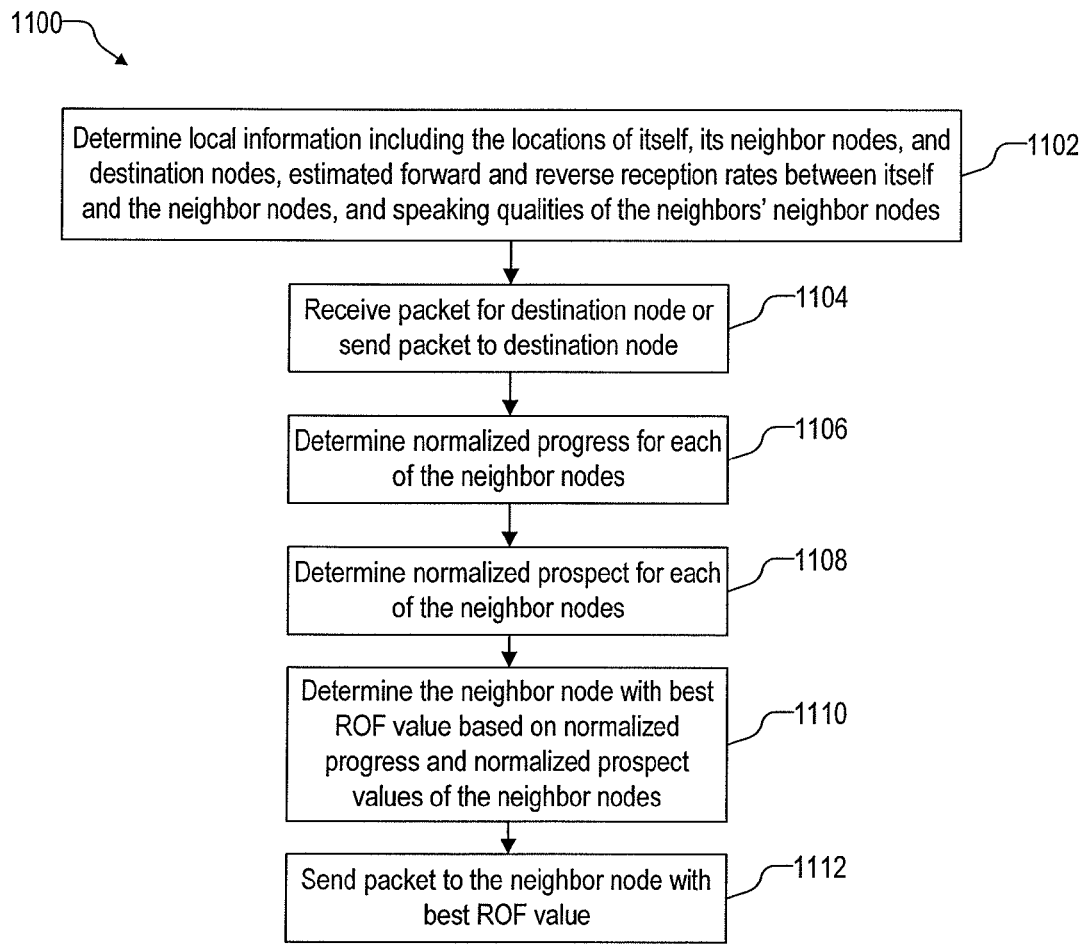
FIG. 11 is a flowchart of a method for a current node $n_c$ to execute the FPSR protocol to determine the neighbor node with the best ROF value to forward a packet.

FIG. 11 is a flowchart of a method 1100 for a current node $n_c$ to execute the FPSR protocol to determine the neighbor node $n_i$ with the best ROF value to forward a packet in one or more embodiments of the present disclosure. Method 1100 may include one or more operations, functions, or actions illustrated by blocks 1102, 1104, 1106, 1108, 1110, and/or 1112. Processing for method 1100 may begin at block 1102.

In block 1102, current node $n_c$ may be adapted to determine locally available information including one or more of the location of current node $n_c$, the location of neighbor nodes, the location of destination node $n_d$, the estimated forward and reverse reception rates between current node $n_c$ and neighbor nodes, and/or the speaking qualities of neighbors to the neighbor nodes.

Current node $n_c$ may be adapted to determine one or more of the location of current node $n_c$, the location of neighbor nodes, the location of destination node $n_d$. The determination of one or more locations may be made based on a localization method that may employ acoustic, radio frequency (RF), light, or global positioning system (GPS) localization. The localization methods may use triangulation where some nodes have know positions or multilateration where most nodes have unknown positions. The locations of one or more of the nodes may also be provided by a system administrator 110 (FIG. 1) to each node.

Current node $n_c$ may be adapted to determine the estimated forward and reverse reception rates between current node $n_c$ and neighbor nodes as follows. In each round, current node $n_c$ may be configured to send a probe packet to a neighbor node $n_i$ and wait for receipt of an acknowledgment packet from neighbor node $n_i$. The wait interval may be longer than the time required for neighbor node $n_i$ to receive the probe packet and to send an acknowledgement packet back. When neighbor node $n_i$ receives the probe packet, it may send an acknowledgment packet to current node $n_c$. The acknowledgment packet may include information indicating the number of times neighbor node $n_i$ has received the probe packet. The round may be repeated for a number of times. The number of rounds may range from 20 for very good or very bad links to several hundreds for links of medium quality. This process may be performed continually, periodically, or on demand so that the forward and the reverse reception rates between current node $n_c$ and neighbor nodes may be updated as needed.

As current node $n_c$ knows how many probe packets it has sent and how many probe packets neighbor node $n_i$ has received, current node $n_c$ can be configured to determine the estimated forward reception rate $P_{ci}$ to the neighbor nodes. As current node $n_c$ also knows how many acknowledgments it has received and how many probe packets neighbor node $n_i$ has received, current node $n_c$ can also be configured to determine the estimated reverse reception rate $P_{ic}$ from neighbor node $n_i$ to current node $n_c$.

From its neighbor nodes, current node $n_c$ may be adapted to receive information about the speaking qualities of neighbor nodes from time to time. This speaking quality information may be included in the acknowledgment packets received from the neighbor nodes. Alternatively, each neighbor node may be configured to send a packet with this information periodically to current node $n_c$. Block 1102 may be followed by block 1104.

In block 1104, current node $n_c$ may be configured to receive a packet destined for destination node $n_d$. Alternatively, current node $n_c$ may itself have a packet it needs to send to destination node $n_d$. Block 1104 is optionally followed by block 1106.

In block 1106, current node $n_c$ may be configured to determine the normalized progress for each of the neighboring nodes of current node $n_c$. As discussed above, the normalized progress for a neighbor node $n_i$ may be equal to the sum of the estimated two-way link cost from current node $n_c$ to neighbor node $n_i$ and the average estimated path cost from neighbor node $n_i$ to destination node $n_d$. The estimated two-way link cost from current node $n_c$ to neighbor node $n_i$ may be determined based on the estimated forward and revere reception rates $P_{ci}$ and $P_{ic}$. The average estimated path cost from neighbor node $n_i$ to destination node $n_d$ may be determined from the function of FIG. 8 based on the geometric distance between neighbor node $n_i$ and destination node $n_d$. Block 1106 may be followed by block 1108.

In block 1108, current node $n_c$ may be configured to determine the normalized prospect for each of the neighbor nodes. As described above, the normalized prospect for a neighbor node $n_i$ may be defined as the CSQ of neighbor node $n_i$. The CSQ of neighbor node $n_i$ may be determined from the speaking quality of neighbor node $n_i$ and the speaking qualities of the neighbor's neighbor nodes as described above. Block 1108 may be followed by block 1110.

In block 1110, current node $n_c$ may be configured to determine the neighbor node with the best ROF value based on the change in the normalized progress and the normalized prospect values of the neighbor nodes. As described above, the neighbor node with the best ROF value may be the one located below the largest number of the quadratic regression functions of FIG. 10. Block 1110 may be followed by block 1112.

In block 1112, current node $n_c$ may be configured to send the packet to the neighbor node with the best ROF value.

In routing, current node $n_c$ may encounter a local minimum where the neighbor node with the best ROF is not closer to destination node $n_d$ than current node $n_c$. To avoid local minima, the FPSR protocol may use one or more of the following mechanisms: (i) detection of a local minimum; (ii) measuring the current escape time $t_e$ for escaping the local minimum; (iii) measuring the overall routing time $t_o$ for the packet; and/or (iv) selecting the preferred direction for the escape route. The first mechanism may be deterministic and the last three may be probabilistic. Other additional mechanisms may also be employed.

The FPSR protocol may operate in multiple modes: (i) forward progress mode or (ii) local minima escape mode. In both modes current node $n_c$ may be configured to send the packet to the neighbor node with the best ROF. However, while in the forward progress mode, the FPSR protocol may be configured to target the real destination node $n_d$. In the local minima escape mode, the FPSR protocol may be configured to target a virtual destination node. The position of the virtual destination may be on the same geometric distance as the real destination node $n_d$ from current node $n_c$ but its angle may increase from approximately 0 to approximately 90 degrees as the overall routing time $t_o$ increases. Both the overall routing time $t_o$ and the current escape time $t_e$ may be measured using probabilistic mechanisms.

The transition from the forward progress mode to the local minima escape mode may be triggered when a message to current node $n_c$ is determined to be the neighbor node with the best ROF. The transition from the local minima escape mode to the forward progress mode may be triggered when a predefined maximal escape time is determined to expire.

FIG. 12 shows a pseudo code of an algorithm 1 that summarizes a probabilistic approach for escaping the local minima in one or more embodiments of the present disclosure. In the illustrated algorithm, maximal escape time $k_{em}$ and maximal overall routing time $k_{om}$ may denote predefined maximal allowed times for the current escape time $t_e$ and the overall routing time $t_o$, respectively. State bits ($1+k_o+k_e$) may be included in each packet where one mode state bit indicates whether the FPSR protocol is in the forward progress mode or the local minima escape mode, one or more state bits $k_e$ indicate the current escape time $t_e$, and one or more state bits $k_o$ indicate the overall routing time $t_O$. Both state bits $k_o$ and state bits $k_e$ may be 0 or more. A probabilistic timing mechanism, denoted by probability function prob( ) in lines 7 and 14 of algorithm 1 may be used to reduce the required number of state bits $k_e$ and $k_o$ used for storing current escape time $t_e$ and overall routing time $t_o$, respectively. For wireless network 100, the probabilities for incrementing state bits $k_o$ and state bits $k_e$ may be on the order of approximately 0.1, and approximately 0.2 to approximately 0.5, respectively. The probabilities may be reduced for larger wireless networks and increased for smaller wireless networks. The probability for state bits $k_e$ may be reduced as its value increases for very large and non-uniform wireless networks. State bits $k_o$ may be increased when state bits $k_e$ reach its maximal value and is reset. The number of bits and the probabilities may be determined statistically from the example empirical data. In some examples, state bits $k_o$ may be two bits and state bits $k_e$ may be one bit.

Figure 13:
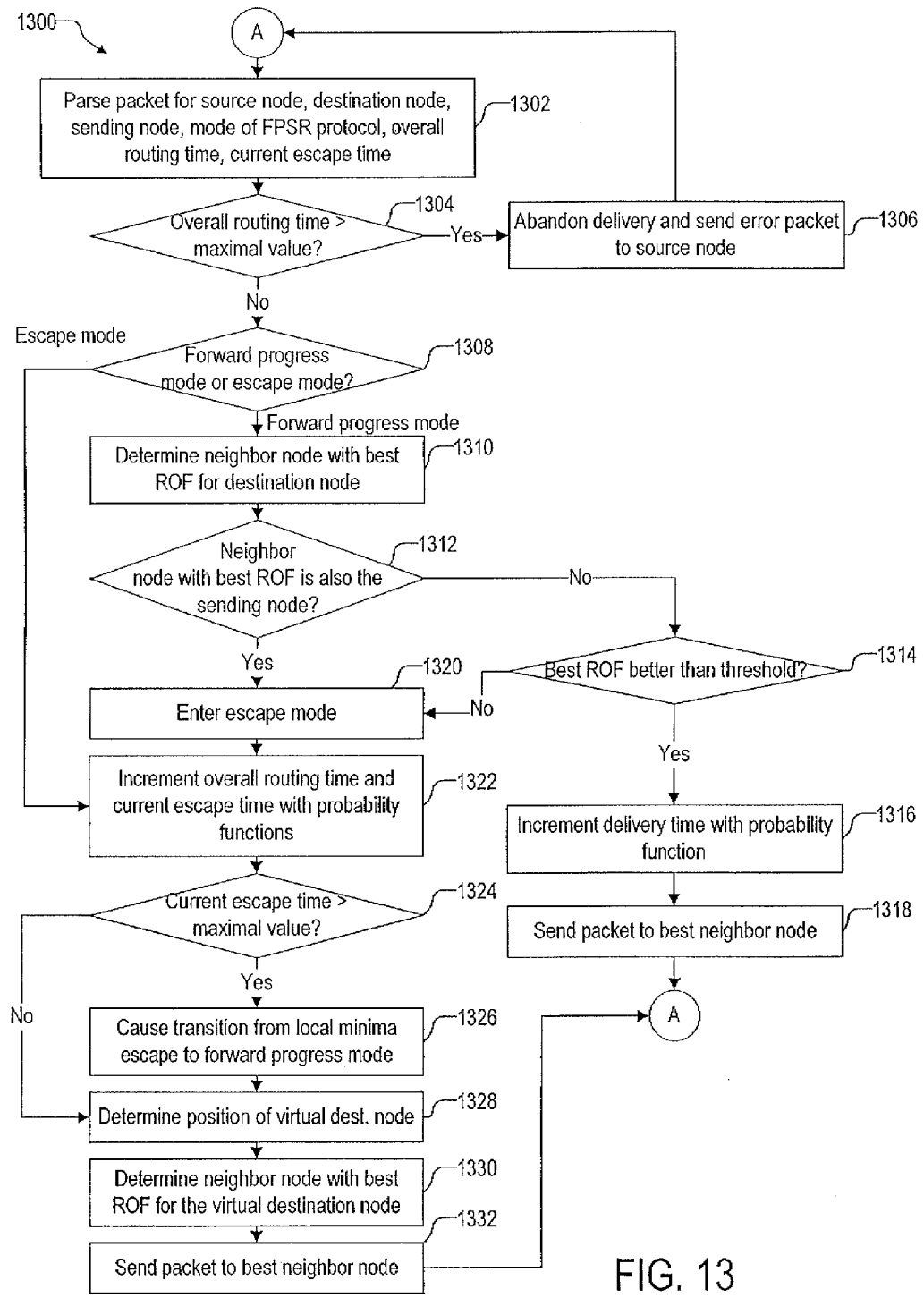
FIG. 13 is a flowchart of a method for implementing the algorithm of FIG. 12.

FIG. 13 is a flowchart of a method 1300 for implementing the algorithm of FIG. 12 in accordance with one or more embodiments of the present disclosure. Method 2100 includes one or more operations, functions, or actions as illustrated by blocks 1302, 1304, 1306, 1308, 1310, 1312, 1314, 1316, 1318, 1320, 1322, 1324, 1326, 1328, 1330, and/or 1332. Processing for method 1300 may begin at block 1302.

In block 1302, current node $n_c$ may be adapted to receive and parse a packet for source node $n_s$, destination node $n_d$, the sending node (the neighbor node that just sent the packet to the current node $n_c$), the mode of the FPSR protocol, overall routing time $t_o$, and/or current escape time $t_e$. As described above, the mode of the FPSR protocol may be represented by one mode state bit, overall routing time $t_o$ may be represented by state bits $k_o$, and current escape time $t_e$ may be represented by state bits $k_e$. Block 1302 may be followed by block 1304.

In block 1304, current node $n_c$ may be configured to determine if overall routing time $t_o$ is greater than maximal overall routing time $k_{om}$. When overall routing time $t_o$ is greater than maximal overall routing time $k_{om}$, block 1304 may be followed by block 1306. Otherwise block 1304 may be followed by block 1308 when the overall routing time $t_o$ fails to be greater than maximal overall routing time $k_{om}$.

In block 1306, current node $n_c$ may be configured to abandon delivery of the packet by discarding the packet. Current node $n_c$ may also be arranged to send an error packet to source node $n_s$ to indicate that the delivery of the packet has failed. Block 1306 may loop back to block 1302 to process another packet.

In block 1308, current node $n_c$ may be arranged to determine if the FPSR protocol is in the forward progress mode or the local minima escape mode. When the FPSR protocol is determined to be in the forward progress mode, block 1308 may be followed by block 1310. When the FPSR protocol is determined to be in the local minima escape mode, block 1308 may be followed by block 1320.

In block 1310, current node $n_c$ may be arranged to identify the neighbor node with the best ROF for destination node $n_d$ as previously described in blocks 1104 to 1110 of FIG. 11. Block 1310 may be followed by block 1312.

In block 1312, current node $n_c$ may be arranged to determine if the neighbor node with the best ROF for destination node $n_d$ is also the sending node (the neighbor node that just sent the packet to the current node $n_c$). When the neighbor node with the best ROF for destination node $n_d$ is also the sending node, current node $n_c$ may have found a local minimum and block 1312 may be followed by block 1320. Otherwise block 1312 may be followed by block 1314 when the sending node is not determined to be the neighbor node with the best ROF.

In block 1314, current node $n_c$ may be arranged to determine if the best ROF for destination node $n_d$ is better than a threshold $Thres_{ROF}$. When the best ROF for destination node $n_d$ is determined to be better than threshold $Thres_{ROF}$, block 1314 may be followed by block 1316. For the ROF defined in FIG. 10, the best ROF may be better when it is smaller than threshold $Thres_{ROF}$. Otherwise block 134 may be followed by block 1320 when the best ROF for destination node $n_d$ is not determined to be better than threshold $Thres_{ROF}$.

In block 1316, current node $n_c$ may be configured to increment overall routing time $t_o$ in the packet with a probability function. As described above, overall routing time $t_o$ may be represented by two state bits $k_o$ and the probability for the probability function may be on the order of approximately 0.1. Block 1316 may be followed by block 1318.

In block 1318, current node $n_c$ may be configured to send the packet to the neighbor node with the best ROF for destination node $n_d$. Block 1318 may loop back to block 1302 to process another packet.

In block 1320, current node $n_c$ may be adapted to enter the local minima escape mode of the FPSR protocol. Current node $n_c$ may change the mode state bit in the packet from indicating the forward progress mode to the local minima escape mode. Block 1320 may be followed by block 1322.

In block 1322, current node $n_c$ may be configured to increment overall routing time $t_o$ and current escape time $t_e$ in the packet with respective probability functions. As described above, delivery time $t_o$ may be two $k_o$ state bits and the probability for the probability function may be on the order of approximately 0.1, and current escape time $t_e$ may be one $k_e$ state bit and the probability for the probability function may be on the order of approximately 0.2 to approximately 0.5. Block 1322 may be followed by block 1324.

In block 1324, current node $n_c$ may be arranged to determine if current escape time $t_e$ is greater than maximal escape time $k_{em}$. When current escape time $t_e$ is determined to be greater than maximal escape time $k_{em}$, block 1324 may be followed by block 1326. Otherwise block 1324 may be followed by block 1328 when the current escape time $t_e$ is determined to not be greater than maximal escape time $k_{em}$.

In block 1326, current node $n_c$ may arranged to adapt the FPSR protocol to transition from the local minima escape mode to the progress forward mode at the next neighbor node in the route. Current node $n_c$ may be arranged to change the mode state bit in the packet from indicating the local minima local escape mode to the forward progress mode and set current escape time $t_e$ equal to zero. Block 1326 may be followed by block 1328.

In block 1328, current node $n_c$ may be arranged to determine the position of a virtual destination node. As described above, the virtual destination node may be determined to be located at the same geometric distance as destination node $n_d$ from current node $n_c$ and may have an angle that increases from approximately 0 to approximately 90 degrees as overall routing time $t_o$ increases. Block 1328 may be followed by block 1330.

In block 1330, current node $n_c$ determines the neighbor node with the best ROF for the virtual destination node as described in blocks 1104 to 1110 of FIG. 11. Block 1330 may be followed by block 1332.

In block 1332, current node $n_c$ sends the packet to the neighbor node with the best ROF for the virtual destination node. Block 1332 may loop back to block 1302 to process another packet.

In one or more embodiments of the present disclosure, the FPSR protocol may select a subset of the links with a particular quality and treat all of them as perfect links while the other links may be considered non-operational. Two prime candidates may be links with high reception rate and links which have high ratio of distance (between the two nodes) to the two-way link cost. Links that have high ratio of distance to the two-way link cost may be links with a ratio higher than 0.3 m per transmission.

Figure 14:
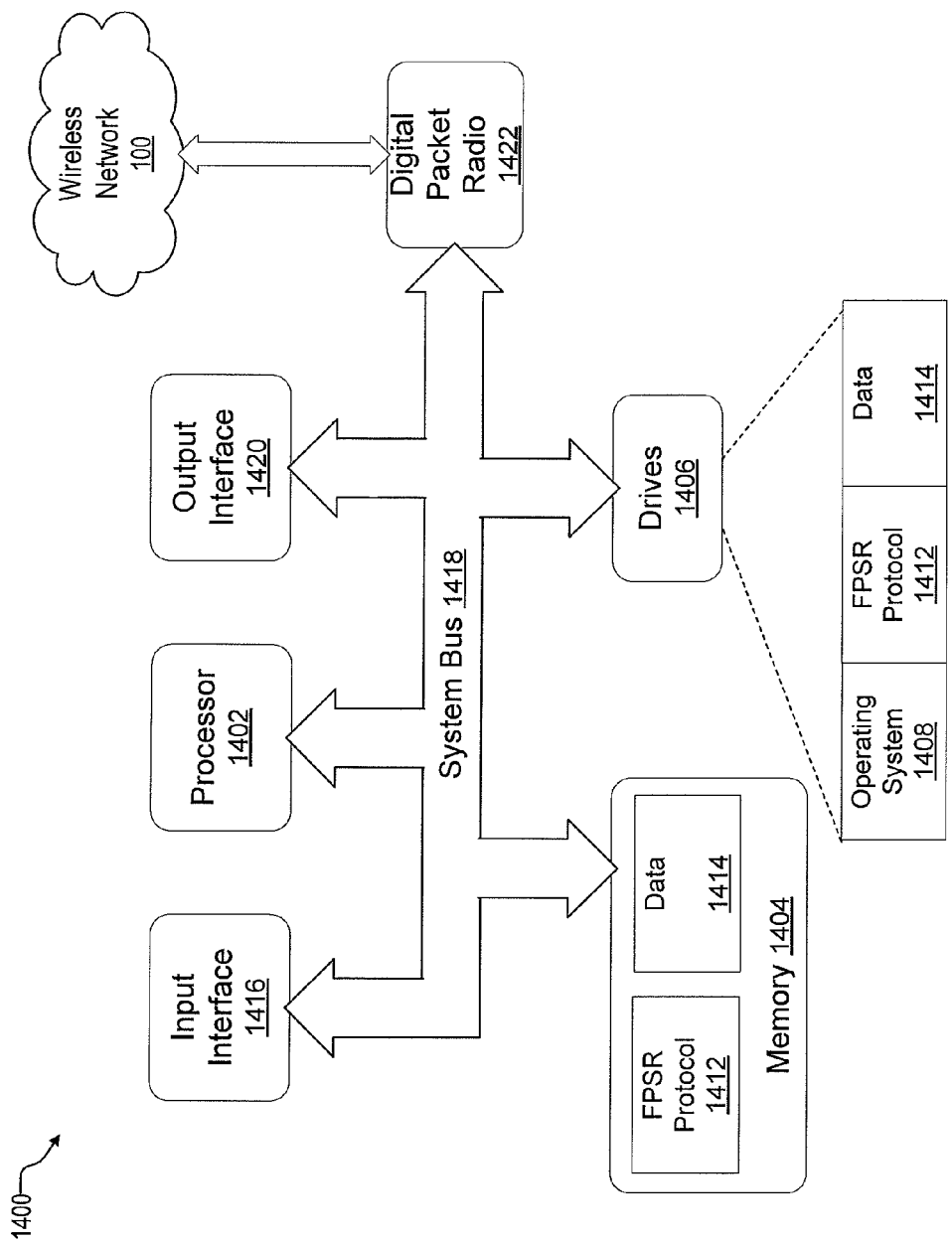
FIG. 14 illustrates an example node for implementing one or more embodiments of the FPSR protocol.

FIG. 14 illustrates an example node 1400 for implementing one or more embodiments of the FPSR protocol of the present disclosure. Node 1400 may include a processor 1402, memory 1404, and/or one or more drives 1406. Drives 1406 may be configured to provide storage of computer readable instructions, data structures, program modules, content, and other data for node 1400. Drives 1406 may include an operating system 1408, the FPSR protocol 1412, and/or data 1414. Node 1400 may further include an input interface 1416 through which commands and data may be entered. Input devices may be coupled to the input interface 1416, and may comprise an electronic digitizer, a microphone, a keyboard or a pointing device, commonly referred to as a mouse, trackball or touch pad. Other example input devices may include a joystick, game pad, satellite dish, scanner, or the like.

These and other input devices may be coupled to processor 1402 through the input interface 1416 that may be coupled to a system bus 1418, but may be coupled by other interface and bus structures, such as a parallel port, game port or a universal serial bus (USB). Node 1400 may also include other peripheral output devices such as speakers and video displays which may be coupled through an output interface 1420 or the like.

Node 1400 may communicate to other nodes in wireless network 100 through a digital packet radio 1422. The other nodes may be a personal computer (PC), a server, a router, a network PC, a mobile phone, a peer device, or other common network node, and may include many or all of the elements described above relative to node 1400. Wireless network 100 may be a wireless sensor network, a wireless mesh network, or another wireless ad-hoc network. According to one or more embodiments, node 1400 may be coupled to wireless network 100 and configured such that processor 1402 may perform the FPSR protocol 1412.

Figure 15:
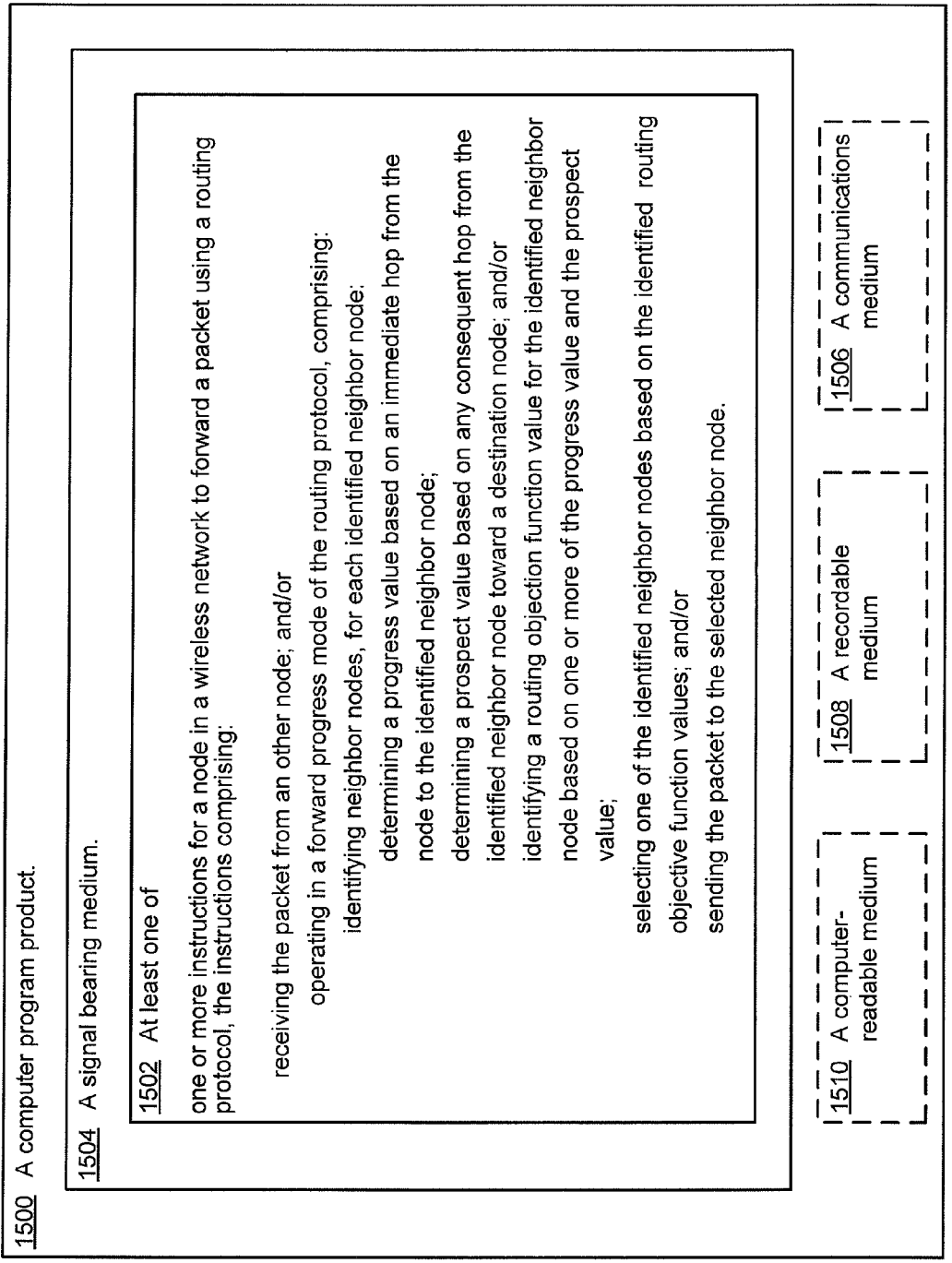
FIG. 15 is a block diagram illustrating a computer program product for the node of FIG. 14, all arranged in accordance with at least some embodiments of the present disclosure.

FIG. 15 is a block diagram illustrating a computer program product 1500 for node 1400, arranged in accordance with one or more embodiments of the present disclosure. Computer program product 1500 may include one or more sets of instructions 1502 for executing the methods of the FPSR protocol. Computer program product 1500 may be transmitted in a signal bearing medium 1504 or another similar communication medium 1506. Computer program product 1500 may be recorded in a computer readable medium 1510 or another similar recordable medium 1508.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A data processing system may be implemented utilizing any suitable commercially available components, such as those that may be found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean *at* least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for a node in a wireless network to forward a packet using a routing protocol, the method comprising:
   receiving the packet from another node; and
   operating in a forward progress mode of the routing protocol, comprising:
      identifying neighbor nodes, for each identified neighbor node:
         determining a progress value based on an immediate hop from the node to the identified neighbor node, comprising determining a first expected cost of sending the packet from the node to the identified neighbor node as $Cc_i$, wherein $Cc_i$ is given as:

$$C_{ci} = \frac{1}{P_{ci}P_{ic}} + \frac{1}{P_{ic}},$$

where $P_{Ci}$ is a probability of a successful packet transmission from the node to the identified neighbor node, and $P_{ic}$ is a probability of a successful packet transmission from the identified neighbor node to the node;
         determining a prospect value based on any consequent hop from the identified neighbor node toward a destination node; and
         identifying a routing objection function value for the identified neighbor node based on one or more of the progress value and the prospect value;
      selecting one of the identified neighbor nodes as a selected neighbor node based on the identified routing objective function values; and
      sending the packet to the selected neighbor node.

2. The method of claim 1, wherein determining the progress value comprises:
   determining a second expected cost of sending the packet from the identified neighbor node toward the destination node; and
   summing the $Cc_i$ first and the second expected cost.

3. The method of claim 2, wherein determining the second expected cost comprises:
   determining an average expected cost from the identified neighbor node to the destination node based on empirical data collected from the wireless network.

4. The method of claim 1, wherein determining the prospect value comprises:
   determining when a neighbor node of the identified neighbor node provides a rate of progress toward the destination node that is faster by a predetermined amount than a rate of progress provided by the identified neighbor node toward the destination node;
   when a neighbor node of the identified neighbor node provides a rate of progress toward the destination node that is faster by the predetermined amount than the rate of progress provided by the identified neighbor node toward the destination node, setting the prospect value equal to a transmitter quality value of the identified neighbor node, the transmitter quality value of the identified neighbor node being based on the empirical data; and
   setting the prospect value equal to zero when no neighbor node of the identified neighbor node provides a rate of progress toward the destination node that is faster by the predetermined amount than the rate of progress provided the identified neighbor node toward the destination node.

5. The method of claim 1, further comprising:
   parsing the packet to determine an overall routing time; and
   when the overall routing time is determined to be greater than a maximal routing time:
      dropping the packet to the destination node; and
      sending another packet to a source node of the packet, the other packet indicating that the packet has been dropped.

6. The method of claim 1, further comprising:
   parsing the packet to determine an overall routing time; and
   incrementing the overall routing time with a probability function.

7. The method of claim 1, further comprising:
   parsing the packet to identify one or more of an overall routing time, a current escape time, and a mode of the routing protocol, wherein the mode of the routing protocol is either the forward progress mode or an escape mode;
   when the packet is identified with the forward progress mode, adapting the routing protocol to operate in the forward progress mode;

when the packet is identified with the escape mode, adapting the routing protocol to operate in the escape mode, the escape mode comprising:
incrementing the overall routing time and the current escape time in the packet;
determining a virtual destination node; and
sending the packet to one of the identified neighbor nodes based on routing objective function values of the identified neighbor nodes for the virtual destination node.

8. The method of claim 7, wherein the duration of the overall routing time and the current escape time are incremented by probability functions.

9. The method of claim 7, wherein the escape mode of the routing protocol further comprises:
determining when the current escape time is greater than a maximal escape time; and
when the current escape time is determined to be greater than the maximal escape time, changing the mode of the routing protocol recorded in the packet to the forward progress mode of the routing protocol.

10. The method of claim 7, wherein the forward progress mode further comprises:
determining when the selected neighbor node is the other node;
when the selected neighbor node is the other node:
changing the mode of the routing protocol recorded in the packet to the escape mode of the routing protocol; and
adapting the routing protocol to operate in the escape mode.

11. The method of claim 10, wherein determining the virtual destination node comprises:
placing the virtual destination node at a distance from the node equal to a distance from the node to the destination node; and
placing the virtual destination node at an angle from a line defined between the node and the destination node, wherein the angle is based on the overall routing time.

12. A non-transitory computer-readable storage medium encoded with computer-executable instructions for a node in a wireless network to forward a packet using a routing protocol, the instructions comprising:
receiving the packet from another node; and
operating in a forward progress mode of the routing protocol, comprising:
identifying neighbor nodes, for each identified neighbor node:
determining a progress value based on an immediate hop from the node to the identified neighbor node, comprising determining a first expected cost of sending the packet from the node to the identified neighbor node as $Cc_i$, wherein $Cc_i$ is given as:

$$C_{ci} = \frac{1}{P_{ci}P_{ic}} + \frac{1}{P_{ic}},$$

where $P_{Ci}$ is a probability of a successful packet transmission from the node to the identified neighbor node and $P_{iC}$ is a probability of a successful packet transmission from the identified neighbor node to the node;
determining a prospect value based on any consequent hop from the identified neighbor node toward a destination node; and
identifying a routing objection function value for the identified neighbor node based on one or more of the progress value and the prospect value;
selecting one of the identified neighbor nodes as a selected neighbor node based on the identified routing objective function values; and
sending the packet to the selected neighbor node.

13. The non-transitory computer-readable storage medium of claim 12, wherein the instructions further comprise:
parsing the packet to identify one or more of an overall routing time, a current escape time, and a mode of the routing protocol, wherein the mode of the routing protocol is either the forward progress mode or an escape mode;
when the packet is identified with the forward progress mode, adapting the routing protocol to operate in the forward progress mode;
when the packet is identified with the escape mode, adapting the routing protocol to operate in the escape mode, the escape mode comprising:
incrementing the overall routing time and the current escape time in the packet;
determining a virtual destination node; and
sending the packet to one of the identified neighbor nodes based on routing objective function values of the identified neighbor nodes for the virtual destination node.

14. The non-transitory computer-readable storage medium of claim 13, wherein the duration of the overall routing time and the current escape time are incremented by probability functions.

15. The non-transitory computer-readable storage medium of claim 13, wherein the instructions for the forward progress mode further comprise:
determining when the selected neighbor node is the other node;
when the selected neighbor node is the other node:
changing the mode of the routing protocol recorded in the packet to the escape mode of the routing protocol; and
adapting the routing protocol to operate in the escape mode.

* * * * *

UNITED STATES PATENT AND TRADEMARK OFFICE
CERTIFICATE OF CORRECTION

| | |
|---|---|
| PATENT NO. | : 9,014,008 B2 |
| APPLICATION NO. | : 12/539608 |
| DATED | : April 21, 2015 |
| INVENTOR(S) | : Potkonjak |

It is certified that error appears in the above-identified patent and that said Letters Patent is hereby corrected as shown below:

On the Title Page, item "(56)", under "OTHER PUBLICATIONS", in Column 1, Line 6, delete "October 25-20, 2004," and insert -- October 25, 2004, --, therefor.

On the Title Page, item "(56)", under "OTHER PUBLICATIONS", in Column 1, Line 19, delete "Annul" and insert -- Annual --, therefor.

In the Specification

In Column 10, Line 8, delete "Pre" and insert -- Per --, therefor.

In the Claims

In Column 17, Line 60, in Claim 1, delete "$Cc_i$, wherein $Cc_i$" and insert -- $C_{ci}$, wherein $C_{ci}$ --, therefor.

In Column 18, Line 19, in Claim 2, delete "$Cc_i$ first" and insert -- $C_{ci}$ --, therefor.

In Column 19, Line 54, in Claim 12, delete "$Cc_i$, wherein $Cc_i$" and insert -- $C_{ci}$, wherein $C_{ci}$ --, therefor.

In Column 20, Line 6, in Claim 12, delete "neighbor node" and insert -- neighbor node, --, therefor.

Signed and Sealed this
Thirteenth Day of October, 2015

Michelle K. Lee
*Director of the United States Patent and Trademark Office*